(12) United States Patent
Peng et al.

(10) Patent No.: US 8,816,578 B1
(45) Date of Patent: Aug. 26, 2014

(54) DISPLAY ASSEMBLY CONFIGURED FOR REDUCED REFLECTION

(75) Inventors: Guolin Peng, Marion, IA (US); Tracy J. Barnidge, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 15 days.

(21) Appl. No.: 13/550,277

(22) Filed: Jul. 16, 2012

(51) Int. Cl.
*H01J 29/89* (2006.01)

(52) U.S. Cl.
USPC ........... 313/478; 348/834; 362/97.2; 362/618

(58) Field of Classification Search
USPC ............... 362/33, 217.02, 217.03, 249.01, 362/249.02, 330–332, 559, 561, 600, 602, 362/606–614, 618, 623–627, 97.1–97.4, 362/277, 279, 282, 290, 309, 617, 633, 362/634; 345/48, 84; 349/61–65, 113, 115, 349/117, 119, 181, 194; 348/834; 313/478
See application file for complete search history.

(56) References Cited

U.S. PATENT DOCUMENTS

| | | | |
|---|---|---|---|
| 4,812,709 A * | 3/1989 | Dudasik ........................ | 313/478 |
| 5,579,139 A | 11/1996 | Abileah et al. | |
| 5,715,028 A | 2/1998 | Abileah et al. | |
| 6,882,386 B2 * | 4/2005 | Moon et al. ..................... | 349/98 |
| 6,911,238 B2 * | 6/2005 | Okawa et al. .................. | 428/1.1 |
| 7,030,945 B2 * | 4/2006 | Umemoto et al. .............. | 349/65 |
| 7,271,864 B2 * | 9/2007 | Yoon .............................. | 349/96 |
| 7,502,081 B2 * | 3/2009 | Umemoto et al. .............. | 349/63 |
| 8,045,131 B2 * | 10/2011 | Uesaka et al. ................. | 349/191 |
| 8,314,918 B2 * | 11/2012 | Kean et al. ..................... | 349/181 |
| 2003/0169391 A1 * | 9/2003 | Uchida et al. ................. | 349/130 |
| 2006/0077325 A1 * | 4/2006 | Li et al. ......................... | 349/115 |
| 2009/0165943 A1 * | 7/2009 | Kim .............................. | 156/276 |
| 2010/0149459 A1 * | 6/2010 | Yabuta et al. .................. | 349/74 |
| 2012/0003402 A1 * | 1/2012 | Ohashi et al. ................. | 428/1.1 |

OTHER PUBLICATIONS

Advanced Solutions for Light Enhancement, Control and Protection, 3M Display Enhancement and Protection Films, 3M Mobile Interactive Solutions Division, 2011, 6 pages.

* cited by examiner

*Primary Examiner* — Hargobind S Sawhney
(74) *Attorney, Agent, or Firm* — Donna P. Suchy; Daniel M. Barbieri

(57) ABSTRACT

A display system and method uses a display element. The display element can provide linearly polarized light. A wave retarder film can be configured to adjust the phase of the linearly polarized light so that reflections of the linearly polarized light from a surface in the environment of the display are reduced. A first light control layer is configured to constrain the field of view of the display in at least a first direction.

18 Claims, 4 Drawing Sheets

DISPLAY ASSEMBLY CONFIGURED FOR REDUCED REFLECTION

BACKGROUND

The present disclosure relates generally to the field of displays. More particularly, the present disclosure is related to systems for and methods of reducing reflections from displays (e.g. display assemblies).

Displays are utilized in a wide variety of applications including but not limited to applications for aviation, targeting, travel, navigation, medical procedures, and diagnostics. Conventional displays are often provided in an assembly including a display element (e.g., an emissive display element, such as, an organic light emitting diode (OLED) display element, a plasma element, etc., or a transmissive display element, such as a liquid crystal display (LCD)). One exemplary display assembly, an LCD display assembly, includes a liquid crystal layer disposed between a pair of polarizers, a pair of orientation layers and a pair of electrodes. Conventional display assemblies can also include one or more additional optical layers and/or optical components.

A conventional display assembly can emit light (e.g., stray light) which is reflected off surfaces in the environment of the display assembly. Reflected light from the display assembly can interfere with or obstruct the sight of personnel in the environment. For example, in an avionic cockpit environment, the images on the display assembly can be reflected off the canopy or windscreen of the aircraft (e.g., airplane, fighter, helicopter, etc.) and can disturb a pilot's outside view, especially in low visibility situations (e.g., at night, at dawn, at dusk, etc.). According to another example, images from the display in an automobile can be reflected off the windshield or window of the automobile and obstruct the driver's view or distract the driver. Larger displays are more susceptible to reflections associated with stray light from the display.

Therefore, there is a need for a display which reduces distractive reflections in an environment, such as a cockpit or vehicle. Further, there is a need for a display assembly which reduces canopy reflections by controlling light characteristics emitted from the display assembly. Yet further, there is a need for an LCD configured for reduced reflections in an environment including a canopy or a windshield. Still further, there is a need for a system for and method of reducing reflections from a display while allowing the viewer to have a large head motion box. Further still, there is a need for a system for and method of reducing reflections off a side window and/or off a canopy.

SUMMARY

An exemplary embodiment relates to a display or display assembly including a display element, a wave retarder film, and a first light control layer. The wave retarder film is configured to adjust the phase of linearly polarized light from the display element. The phase of the linearly polarized light is adjusted so that reflections of the linearly polarized light from a surface in the environment of the display are reduced. The first light control layer is configured to constrain the field of view of the display in at least a first direction.

Another exemplar embodiment relates to a display including a display element for providing linearly polarized light, a wave retarder, a first light control layer, and a second light control layer. The wave retarder is configured to adjust the phase of the linearly polarized light so that reflections of the linearly polarized light from a surface in the environment of the display are reduced. The first light control layer is configured to constrain the field of view of the display in at least a first direction, and the second light control layer is configured to constrain the field of view of the display in at least a second direction. The combination of the wave retarder and the first and second light control films substantially reduces reflections in the environment of the display in one embodiment. In an alternative embodiment, one of the first light control films is optional.

Another exemplary embodiment relates to a method for making a display assembly. The method includes providing a retarder above a display element, providing the display element above a first light control element, and providing the first light control element above a back light.

Another embodiment relates to a display assembly including a backlight, a first substrate provided above a backlight, a second substrate provided above the first substrate, a display element between the first substrate and the second substrate, an optical retarder above the display element, and a pair of light control films below the display element.

BRIEF DESCRIPTION OF THE DRAWINGS

Exemplary embodiments are described below with reference to the accompanying drawings, wherein like reference designators denote like elements, and.

DETAILED DESCRIPTION OF EXEMPLARY EMBODIMENTS

Figure 1:
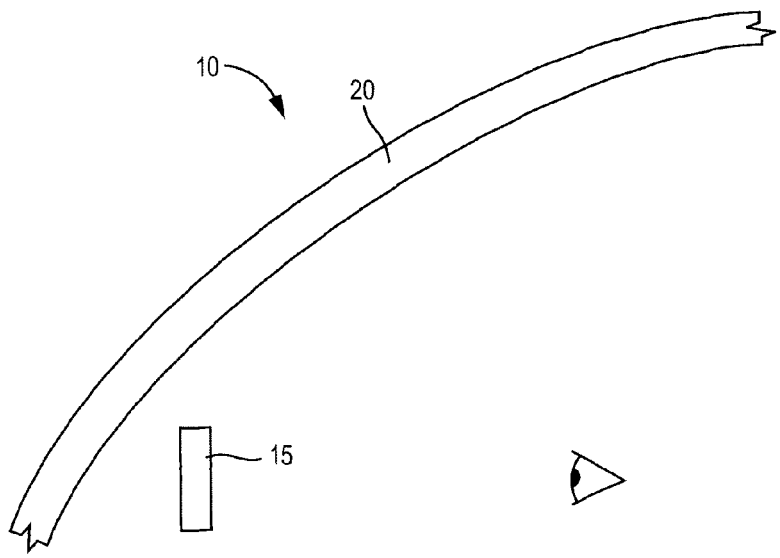
FIG. 1 is a side view schematic drawing of a display in an environment in accordance with an exemplary embodiment.

Before describing in detail the particular improved system method, it should be observed that the invention includes a novel structural combination of optical components, but is not limited to any particular detailed configurations thereof. Accordingly, the structure, methods, functions and arrangement of the components have been illustrated in the drawings by readily understandable schematic representations in order not to obscure the disclosure with the structural details which will be readily apparent to one skilled in the art having the benefit of the description herein. Further, the invention is not limited to the particular embodiments depicted in the exemplary drawings, but should be construed in accordance with the language of the claims.

Referring generally to the figures, a display is configured to reduce unwanted reflections in the display environment. In one embodiment, a combination of an optical retarder and at least one light control film can reduce straylight output by up to 95% of a conventional display. In one embodiment, at least one light control film is tilted to more precisely control reflections in the display environment. In another embodiment, the retarder reduces reflections on a surface in the display environment (e.g., an aircraft cockpit) by adjusting the phase of linearly (e.g., horizontally) polarized light so it is approximately equal to the incidence angle of the light on the surface. The surface can be a side window of a canopy in a cockpit in one embodiment.

With reference to FIG. 1, a display 15 can be provided in an environment 10. Environment 10 can be associated with a variety of applications including driving applications, piloting applications, targeting applications, entertainment applications, navigation applications, medical applications, etc. In one embodiment, environment 10 includes a surface, such as a surface of a wind screen, windshield or canopy 20, from which light can reflect from display 15.

Display 15 provides an image and is advantageously configured to reduce unwanted reflections off canopy 20. In addition, display 15 has a suitable head box for applications, such as, piloting or co-piloting an aircraft. In one embodiment, the combination of a retarder and a light control film reduces reflections of canopy 20 in primary viewing zones. Primary viewing zones can include horizontal viewing zones with respect to the cockpit or canopy 20 in one embodiment. Although environment 10 is shown as including a canopy, environment 10 can be any type of environment where display 15 can be used and obstructive reflections from display 15 are not desired.

In one embodiment, display 15 may comprise a variety of components, either individually, or in combination, including a cover glass (e.g., a rigid or semi-rigid and generally transparent substrate, etc.), flight instrumentation, a user interface, a touch screen (e.g., configured to receive inputs via a stylus, a fingertip, etc.), filters, optical enhancement or films, and the like.

Figure 2:
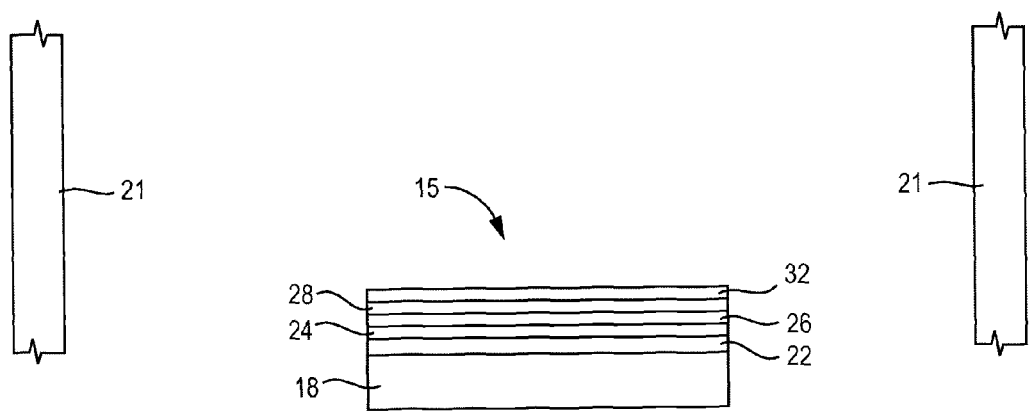
FIG. 2 is a top view schematic block diagram of the display illustrated in FIG. 1 in accordance with another exemplary embodiment.

With reference to FIG. 2, display 15 can be embodied as a display assembly. Display 15 include a backlight 18, a diffuser 22, a light control element or film 24, a light control element or film 26, display element 28 and an optical retarder 32. Backlight 18, diffuser 22 and light control film 24 can be optional. Backlight 18 is disposed below diffuser 22, which is disposed below light control film 24 and light control film 26 in one embodiment. Display element 28 is disposed above films 24 and 26 and below retarder 32 in one embodiment.

Additional layers and optical components can be provided with display 15 without departing from the scope of the invention. Backlight 18, diffuser 22, film 24, film 26, element 28, and retarder 32 can be attached or coupled together with brackets and/or adhesives. Backlight 18, diffuser 22, film 24, film 26, element 28 and retarder 32 can also be mounted on a frame in one embodiment. In one embodiment, films, 24, 26, element 28, and retarder 32 are adhered or coupled to each other by an optical adhesive. Films 24 and 26 may be bonded together and then laminated between rigid, transparent substrates for added flatness or rigidity. The substrate(s) may be flat, angled or curved to further shape the light output.

Backlight 18 can be embodied as an LED backlight 18. Backlight 18 is not shown in a limiting fashion. Any type of backlight 18 can be used with display 15. Backlight 18 can also be comprised of a light source and a light guide. The light source can be any type of light source, including an LED light source, an incandescent light source, an electroluminescence light source, a fluorescent light source, etc.

Light control film 24 constrains the field of view of display 15 in at least one direction. Light control film 26 constrains the field of view of display 15 in at least another direction. Constraining the field of view of display 15 reduces the reflections in environment 10 due to stray light from display 15. In one embodiment, display 15 includes both light control films 24 and 26 or just one of films 24 and 26.

Light control films 24 and 26 are embodied as louver films in one embodiment. Film 24 can be a vertical light control film in one embodiment, and film 26 can be a horizontal light control film in one embodiment. Alternatively, film 26 can be a vertical light control film, and film 24 can be a horizontal light control film. In one embodiment, film 24 embodied as a vertical louver film reduces reflections off the top interior of canopy 20.

Alternatively, films 24 and 26 can be replaced by one or more fiber optic face plates that restrict the field of view of display 15. The fiber optic face plate can include fiber optic members clad in opaque material. The members can be disposed normal to the surface of display element 28 or at an angle depending upon display criteria.

Film 26 (e.g., horizontal film) constrains the light in one direction (e.g., horizontally—in a Y direction on display element 28) to an exemplary field of view (FOV) plus or minus approximately 45 degrees or less in one embodiment. Film 26 (e.g., vertical film) constrains light in another direction (e.g., vertically—in a Y direction on display element 28) to an exemplary field of view of plus and minus approximately 45 degrees or less in one embodiment. Light control films 24 and 26 can be optical substrates having very fine black stripes, grating or ribbons spaced at a pitch across the film in the constrained directions. The pitch is chosen to effect the appropriate field of view for display 15.

Alternatively, films 24 and 26 can be disposed above display element 28. Films 24 and 26 can be disposed above or below retarder 32. Placement of films 24 and 26 behind display element 28 is advantageous because such placement does not degrade image quality from display 15 in one embodiment. In one embodiment, films 24 and 26 are disposed at a rotation of 6 degrees to 15 degrees counter-clockwise with respect to display element 28. Such a rotation reduces interference patterns.

Retarder 32 can be comprised of a number of films, layers or elements in one embodiment. In one embodiment, retarder 32 is comprised of two quarter wave plates and is configured for light associated with display 15 (e.g., $\lambda$=390-780 nm). Other values for retarder 32 can be utilized depending upon design criteria and system parameters. Retarder 32 is configured to adjust the phase of light from display element 28 such that light from display 15 received by canopy 20 (e.g., surfaces 21) does not substantially reflect in one embodiment. In one embodiment, light from display element 28 is linearly polarized light, and the phase of the linearly polarized light is adjusted by retarder 32 so that the phase is equal to the angle of incidence on at least one surface 21. The adjustment advantageously reduces reflections from the at least one surface 21. Applicants have found that an approximately half wave retarder serves to substantially reduce reflections from horizontal viewing surfaces in the cockpit of a fighter aircraft.

Display 15 may be a generally planar display assembly, and may be a rigid, semi-rigid, or flexible display. In some embodiments, display element 28 is or includes a liquid crystal display (LCD) assembly. In other embodiments, other types of display elements may be used or more than one display element 28 can be used in display 15.

According to one embodiment, display element 28 can be laminated LCD assembly. Display element 28 can include a first polarizer, a first glass substrate, a liquid crystal, a liquid crystal layer, a second glass substrate element, and a second polarizer. Display element 28 can also include retarder 32, an optical film such as a dual brightness enhancing film, filters and other optical components.

Display element 28 can be any type of device providing images (e.g., images using linearly polarized light) for display 15. In one embodiment, display element 28 is an emissive display assembly. Display 15 can also include multiple display elements for three dimensional and stereoscopic applications. Display 15 can be manufactured in a dry film lamination process.

Figure 3:
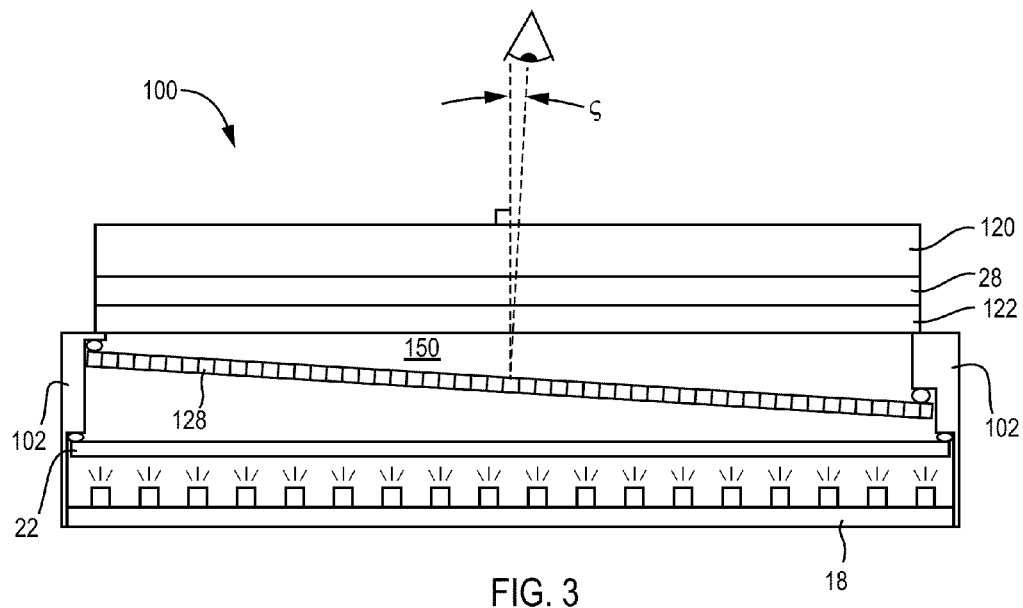
FIG. 3 is a side view schematic drawing of the display illustrated in FIG. 1 in accordance with yet another exemplary embodiment.

With reference to FIG. 3, a display 100 can be used as a display 15. Display 300 includes a cover glass or substrate 120, display element 28 (e.g., an LCD element), a rear glass or substrate 122, a light control film 128, backlight 18 and diffuser 22.

A mounting bracket or frame 102 can be provided to provide a tilt to film 128 with respect to a normal ray from the surface of display element 128. The tilt provides a delta angle from the normal ray from display element 28. The tilt allows the field of view to be tailored for a specific environment, such as a cockpit.

Film 128 is a vertical louver film in one embodiment. An air gap 150 is provided between light control film 128 and substrate 122. Film 128 can be similar to either of films 24 and 26 in one embodiment. In one embodiment, film 128 can be adhered or coupled to rigid, transparent substrates. Display element 28 can include a retarder similar to retarder 32 in one embodiment. Film 128 is a vertical louver film in one embodiment. Film 128 may be flat or curved depending on design criteria.

Substrates 120 and 122 are transmissive or translucent material in one embodiment. Substrates 120 and 122 can be a glass material suitable for optical applications. Substrates 120 and 122 can be rigid, flexible, flat or curved depending upon design criteria. In one embodiment, substrates 120 and 122 are typically 1.1 mm thick, flat glass plates.

Figure 4:
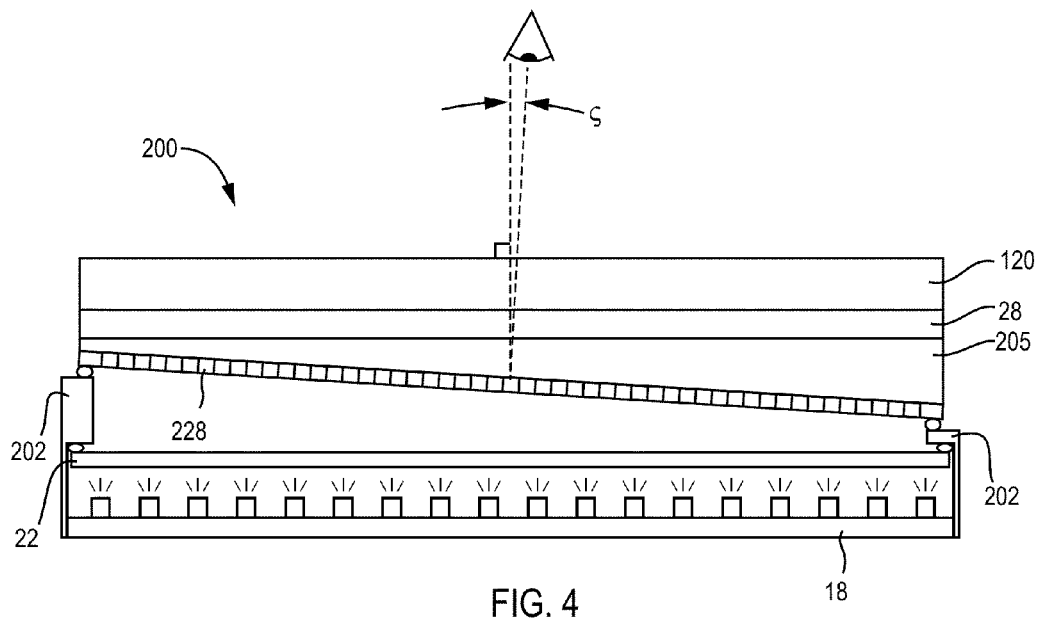
FIG. 4 is a side view schematic drawing of the display illustrated in FIG. 1 in accordance with still another exemplary embodiment.

With reference to FIG. 4, a display 200 can be utilized as display 15. Display 200 includes substrate 120, display element 28, a substrate or rear glass 205, a light control film 228, diffuser 22, and backlight 18.

A mounting bracket or frame 202 can hold diffusers 22 and film 228. Mounting bracket or frame 202 can provide a tilt angle for film 208 with respect to a normal ray from the surface of display element 28. Film 228 is adhered by an adhesive to rear glass 205 in one embodiment. Rear glass 205 is shaped to provide the appropriate tilt with respect to display element 28 in one embodiment. Film 228 can be similar to films 24 and 26 in one embodiment. Film 228 is a vertical louver film in one embodiment.

Figure 5:
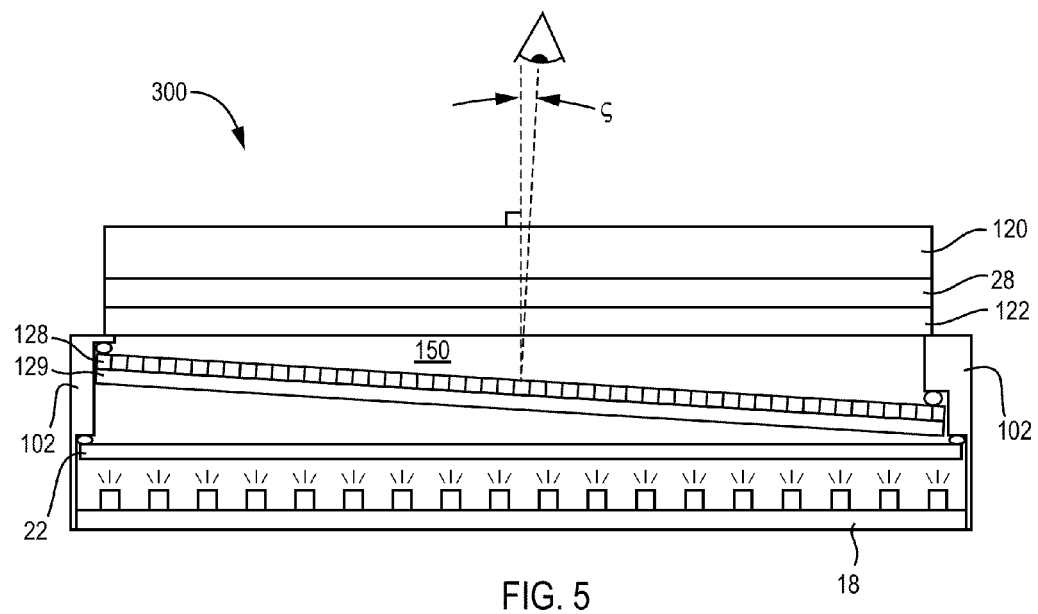
FIG. 5 is a side view schematic drawing of the display illustrated in FIG. 1 in accordance with a further exemplary embodiment.

With reference to FIG. 5, a display 300 can be used as display 15. Display 300 includes light-control films 128 and 129 in one embodiment. Light control films 128 and 129 can be attached together by mechanical means or by adhesive in one embodiment. Mounting bracket 102 provides an appropriate tilt for films 128 and 129. In one embodiment, film 128 can be untilted while film 129 is tilted with respect to a normal ray from the surface of display element 28. Films 228 and 229 can be similar to films 24 and 26. Films 228 and 229 can be coupled or adhered to or between rigid transparent substrates.

Figure 6:
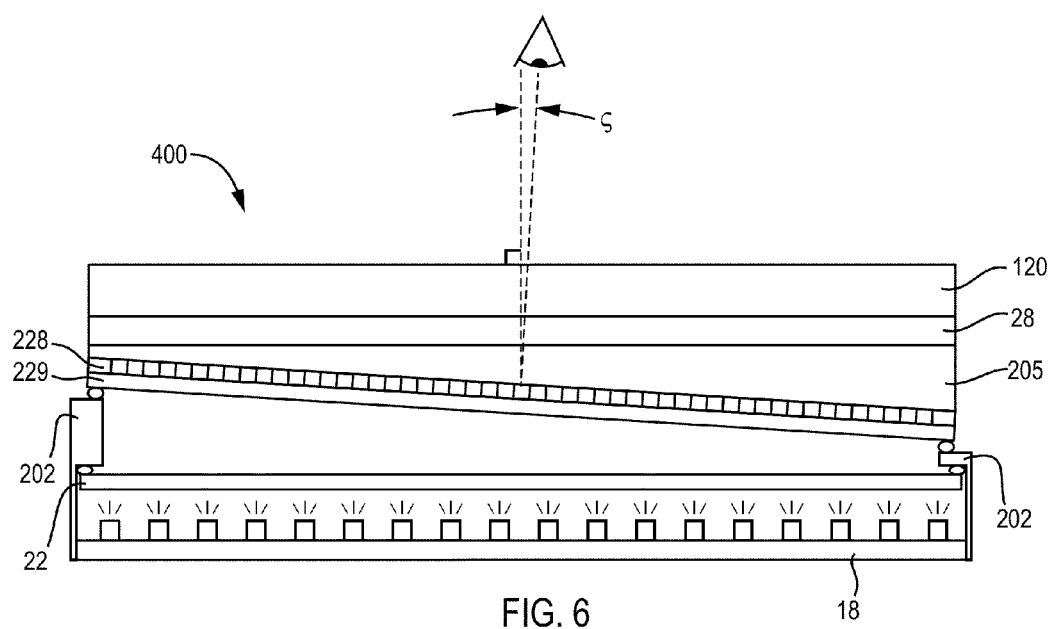
FIG. 6 is a side view schematic drawing of the display illustrated in FIG. 1 in accordance with yet another exemplary embodiment.

With reference to FIG. 6, a display 400 can be used as display 15 discussed with reference to FIG. 1. Display 400 includes light control films 228 and 229 provided below rear glass or substrate 205. Films 228 and 229 can be adhered to substrate 205. In one alternative embodiment, layer 229 is optional. Layers 228 and 229 can be similar to layers 24 and 26.

Figure 7:
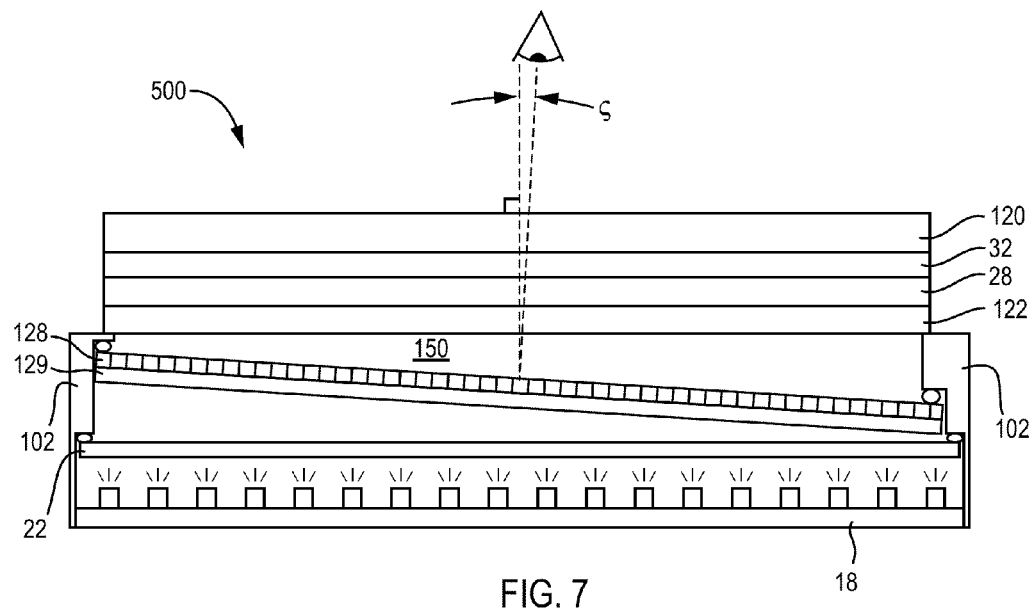
FIG. 7 is a side view schematic drawing of the display illustrated in FIG. 1 in accordance with yet still another exemplary embodiment.

With reference to FIG. 7, a display 500 can be utilized as display 15. Display 500 includes a retarder 32 between substrate 120 and display element 28 in one embodiment. Alternatively, retarder 32 can be provided above substrate 120 or integrated within display element 28. Display 500 includes light control film 128 and light control film 129 which can be similar to films 24 and 26. Light control film 128 or 129 can be optional in one embodiment.

Figure 8:
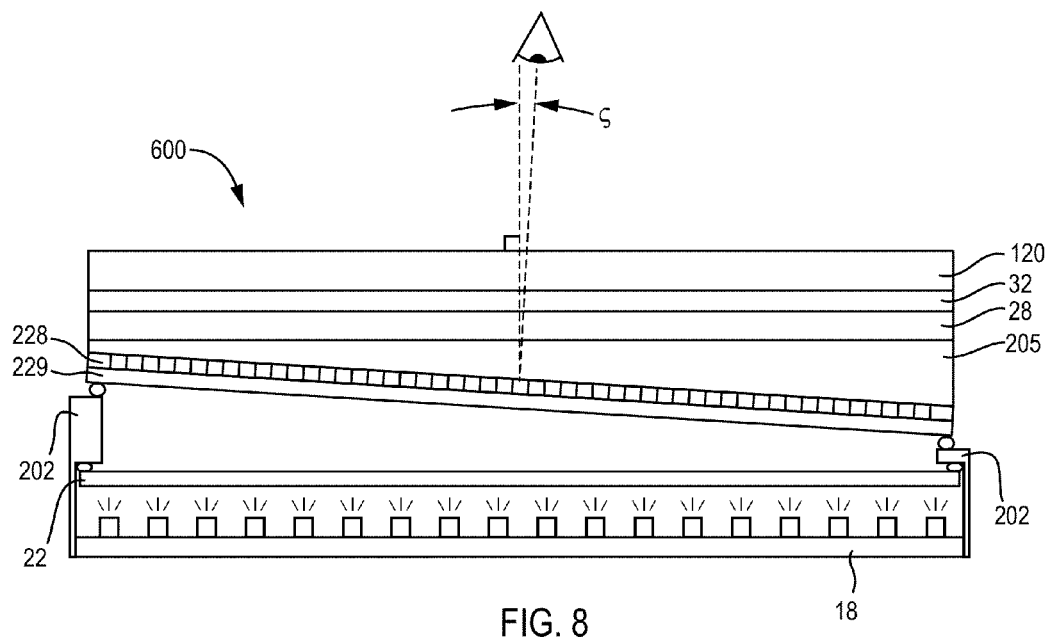
FIG. 8 is a side view schematic drawing of the display illustrated in FIG. 1 in accordance with a still further exemplary embodiment.

With reference to FIG. 8, a display 600 can be utilized as display 15. Display 600 includes light control film 228 and 229. Retarder 32 can be provided between display element 28 and substrate 120. Alternatively, retarder 32 can be provided above substrate 120 or integrated with element 28. In one alternative embodiment, film 228 or 229 is optional. Light control films 228 and 229 are similar to films 24 and 26.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. Such joining may also relate to mechanical, fluid, or electrical relationship between the two components.

It is important to note that the construction and arrangement of the elements of the optical and display assemblies as shown in the exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the embodiments. Accordingly, all such modifications are intended to be included within the scope of the present disclosure as defined in the appended claims. The order or sequence of any process or method steps may be varied or re-sequenced according to alternative embodiments. Other substitutions, modifications, changes, and/or omissions may be made in the design, operating conditions, and arrangement of the exemplary embodiments without departing from the spirit of the present disclosure.

What is claimed is:
1. A display comprising:
   a display element for providing linearly polarized light;
   a retarder configured to adjust the phase of the linearly polarized light so that reflections of the linearly polarized light from a surface in the environment of the display are reduced;
   a first light control layer configured to constrain the field of view of the display in at least a first direction, wherein a normal direction to the first light control layer is tilted with respect to a normal ray from a surface of the display element; and the first light control layer is laminated to a rigid, transparent substrate, the rigid transparent substrate being one of the groups consisting of flat, angled and curved.

2. The display of claim 1, further comprises a second light control layer configured to constrain the field of view of the display in at least a second direction.

3. The display of claim 2, wherein the first light control layer is a louver film.

4. The display of claim 1, wherein the retarder is approximately a ½ wave retarder film.

5. The display of claim 1, further comprising an adhesive between the display element and the first light control layer.

6. The display of claim 5, wherein the display element is a laminated assembly including polarizers.

7. The display of claim 1, wherein the field of view is constrained to plus 45 degrees and minus 45 degrees or less.

8. A method for making a display assembly, the method comprising:
   providing a retarder above a display element;
   providing the display element above a first light control element, wherein the first light control element is tilted with respect to a main surface of the display element;
   providing the first light control element above a backlight and the light control element is laminated to a rigid, transparent substrate, the rigid transparent substrate being one of the group consisting of flat, angled and curved.

9. The method of claim 8, wherein the retarder is comprised of a first quarter wave retarder plate and a second quarter wave retarder plate.

10. The method of claim 8, further comprising providing a second light control element below the first light control element.

11. The method of claim 10, wherein the first light control element is a vertical film and the second light control element is a horizontal film.

12. The method of claim 8, wherein the first light control element is a louver film.

13. The method of claim 8, further comprising laminating the retarder to the display element via a first adhesive layer.

14. The method of claim 8, wherein the backlight is an LED backlight.

15. A display assembly, comprising:
   a backlight;
   a first substrate provided above the backlight;
   a second substrate provided above the first substrate;
   a display element between the first substrate and the second substrate;
   an optical retarder above the display element;
   a pair of louver films below the display element, wherein the pair of louver films are tilted with respect to the backlight; and the pair of louver films is laminated to a rigid, transparent substrate, the rigid transparent substrate being one of the group consisting of flat, angled and curved.

16. The display assembly of claim 15, further comprising a diffuser below the pair of louver films.

17. The display assembly of claim 15, wherein the display assembly is deployed in an aircraft having a canopy.

18. The display assembly of claim 17, wherein the pair of louver films are tilted with respect to a main surface of the display element.

* * * * *